US011112717B2

United States Patent
Tzomik et al.

(10) Patent No.: US 11,112,717 B2
(45) Date of Patent: Sep. 7, 2021

(54) ELECTROSTATIC INK COMPOSITIONS AND SCRATCH-OFF STRUCTURES

(71) Applicant: HP Indigo B.V., Amstelveen (NL)

(72) Inventors: Inna Tzomik, Nes Ziona (IL); Albert Teishev, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/566,168

(22) Filed: Sep. 10, 2019

(65) Prior Publication Data

US 2020/0004171 A1 Jan. 2, 2020

Related U.S. Application Data

(63) Continuation of application No. 16/307,412, filed as application No. PCT/EP2016/073468 on Sep. 30, 2016, now Pat. No. 10,514,626.

(51) Int. Cl.

| | |
|---|---|
| *G03G 9/135* | (2006.01) |
| *B42D 15/02* | (2006.01) |
| *C09D 11/03* | (2014.01) |
| *B41M 3/00* | (2006.01) |
| *A63F 3/06* | (2006.01) |
| *C09D 5/00* | (2006.01) |
| *G09F 3/00* | (2006.01) |
| *B42D 25/27* | (2014.01) |
| *G03G 9/125* | (2006.01) |
| *G03G 9/13* | (2006.01) |
| *G03G 13/10* | (2006.01) |

(52) U.S. Cl.
CPC ......... *G03G 9/1355* (2013.01); *A63F 3/0665* (2013.01); *B41M 3/005* (2013.01); *B42D 15/025* (2013.01); *B42D 25/27* (2014.10); *C09D 5/008* (2013.01); *C09D 11/03* (2013.01); *G03G 9/125* (2013.01); *G03G 9/131* (2013.01); *G03G 9/135* (2013.01); *G03G 13/10* (2013.01); *G09F 3/0292* (2013.01); *A63F 2250/08* (2013.01)

(58) Field of Classification Search
CPC ....................................................... G03G 9/13
See application file for complete search history.

(56) References Cited

U.S. PATENT DOCUMENTS

| | | |
|---|---|---|
| 5,803,504 A | 9/1998 | Deshiens et al. |
| 7,796,145 B2 | 9/2010 | Almog et al. |
| 9,116,450 B2 | 8/2015 | Iio et al. |
| 2007/0224398 A1 | 9/2007 | Raksha et al. |

(Continued)

FOREIGN PATENT DOCUMENTS

| | | |
|---|---|---|
| CN | 1523068 | 8/2004 |
| CN | 1539639 | 10/2004 |

(Continued)

OTHER PUBLICATIONS

International Search Report dated May 23, 2017 for PCT/EP2016/073468, Applicant Hewlett-Packard Indigo B.V.

*Primary Examiner* — Peter L Vajda

(74) *Attorney, Agent, or Firm* — Thorpe North & Western LLP

(57) ABSTRACT

Disclosed herein is an electrostatic ink composition comprising a component selected from a fatty acid ester having a plurality of hydroxyl substituents and a fatty acid amide having a plurality of hydroxyl substituents. Also described herein are scratch-off structures and methods for producing them.

13 Claims, 4 Drawing Sheets

(56) References Cited

U.S. PATENT DOCUMENTS

| | | | |
|---|---|---|---|
| 2010/0045026 A1 | 2/2010 | Napolitano et al. | |
| 2010/0253063 A1 | 10/2010 | Skogster | |
| 2014/0287356 A1* | 9/2014 | Mori | G03G 9/125 430/114 |
| 2015/0338757 A1 | 11/2015 | Orlik et al. | |

FOREIGN PATENT DOCUMENTS

| | | | | |
|---|---|---|---|---|
| CN | 104797985 | 7/2015 | | |
| CN | 105793364 | 7/2016 | | |
| JP | S59133561 | 7/1984 | | |
| JP | 2000019787 | 1/2000 | | |
| JP | 2006317782 | 11/2006 | | |
| JP | 2007041027 | 2/2007 | | |
| JP | 2007041161 | 2/2007 | | |
| JP | 2007192947 | 8/2007 | | |
| JP | 2008524640 | 7/2008 | | |
| JP | 2009244832 | 10/2009 | | |
| WO | 2009062297 | 5/2009 | | |
| WO | 2010130041 | 11/2010 | | |
| WO | 2014079482 | 5/2014 | | |
| WO | WO-2014/079482 | * | 5/2014 | G03G 9/08 |
| WO | 2016062359 | 4/2016 | | |

* cited by examiner a)

b)

c)

ELECTROSTATIC INK COMPOSITIONS AND SCRATCH-OFF STRUCTURES

PRIORITY CLAIM

The present application is a continuation of U.S. patent application Ser. No. 16/307,412, filed on Dec. 5, 2018, which is a U.S. National Stage Application under 35 U.S.C. 371 of PCT/EP2016/073468, filed on Sep. 30, 2016, each of which is incorporated herein by reference in its entirety.

BACKGROUND

Scratch-off structures can be objects that have a layer comprising information and an overlying layer obscuring the information, which can be scratched off to reveal the information, but is typically resistant to normal abrasion. The information can vary in a collection of scratch-off structures, and they can be used for many purposes, such as gaming (e.g., in scratch cards used in lottery gaming) or authentication purposes (e.g., on a bank card).

DETAILED DESCRIPTION

Figure 1:
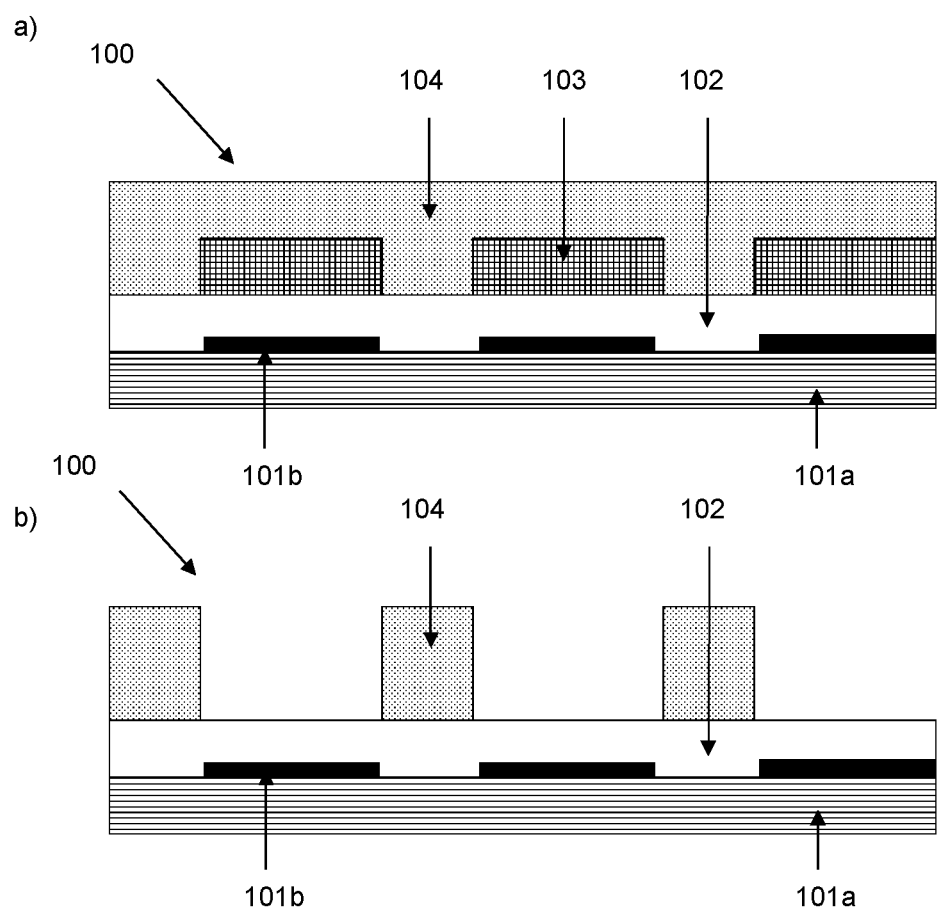
FIG. 1 schematically depicts a cross-section of an example of a scratch-off structure before (a) and after (b) the layers have been scratched off.

Before the present disclosure is disclosed and described, it is to be understood that this disclosure is not limited to the particular compositions, process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which solid components, such as pigment particles (if present), thermoplastic resin, charge directors and other additives, can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise particles comprising a thermoplastic resin. The electrostatic ink composition comprising the release additive (which may be a transparent electrostatic ink composition and used to form the third layer described herein) and/or the coloured electrostatic ink composition (which may be used to form the fourth layer described herein) may be a liquid electrostatic ink composition, in which particles comprising a resin are suspended in a carrier liquid. The transparent and/or the coloured electrostatic ink composition may be in a dry toner form, in which the toner particles are in a dry, but flowable form. In a coloured electrostatic ink composition, the particles may further include a colourant. In the transparent electrostatic ink composition, the particles may lack or substantially lack a colourant, but may further comprise the release additive as described herein. The particles comprising resin will typically be charged or capable of developing charge in an electric field, such that they display electrophoretic behaviour. A charge director may be present to impart a charge to the pigment particles having resin thereon.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g., 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the composition.

As used herein, "acidity," "acid number," or "acid value" refer to the mass of potassium hydroxide (KOH) in milligrams that neutralizes one gram of a substance. The acidity of a polymer can be measured according to standard techniques, for example, as described in ASTM D1386. If the acidity of a particular polymer is specified, unless otherwise stated, it is the acidity for that polymer alone, in the absence of any of the other components of the composition.

As used herein, "melt viscosity" generally refers to the ratio of shear stress to shear rate at a given shear stress or shear rate. Testing is generally performed by using a capillary rheometer. A plastic charge is heated in the rheometer barrel and is forced through a die with a plunger. The plunger is pushed either by a constant force or at a constant rate depending on the equipment. Measurements are taken once the system has reached steady-state operation. One method used is measuring Brookfield viscosity at 140° C., units are mPa·s or cPoise, as known in the art. Alternatively, the melt viscosity can be measured using a rheometer, for example, a commercially available AR-2000 Rheometer from Thermal Analysis Instruments, using the geometry of: 25 mm steel plate—standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" or "liquid electrostatic printing" is a specific type of electrophotographic printing where a liquid composition is employed in the electrophotographic process rather than a powder toner. An electrostatic printing process may involve subjecting the electrostatic composition to an electric field, for example, an electric field having a field gradient of 50-400 V/µm, or more, in some examples 600-900 V/µm, or more.

As used herein, "NVS" is an abbreviation of the term "non-volatile solids".

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, and so forth. This same principle applies to ranges reciting a single numerical value. Furthermore, such an interpretation should apply regardless of the breadth of the range or the characteristics being described.

As used herein, and unless stated otherwise, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

Herein is disclosed an electrostatic ink composition. The electrostatic ink composition may comprise:
  a component selected from a fatty acid ester having a plurality of hydroxyl substituents and a fatty acid amide having a plurality of hydroxyl substituents.

Herein is also disclosed a method for producing a scratch-off structure. The method may comprise:
  providing a substrate having a first layer showing information thereon, and a second layer overlying the first layer, the second layer comprising a polymeric film and being substantially transparent;
  electrostatically printing a third layer over the second layer, the third layer comprising an electrostatic ink, which may be a transparent or a coloured electrostatic ink, wherein the electrostatic ink comprises a component selected from a fatty acid ester having a plurality of hydroxyl substituents and a fatty acid amide having a plurality of hydroxyl substituents; and, in some examples,
  disposing a fourth layer on the third layer, the fourth layer being coloured.

Herein is disclosed a scratch-off structure. The scratch-off structure may comprise the following layers in order:
  a substrate having a first layer showing information thereon,
  a second layer comprising a polymeric film and being substantially transparent;
  a third layer comprising an electrostatic ink, which may be a transparent or a coloured electrostatic ink, wherein the electrostatic ink comprises a component selected from a fatty acid ester having a plurality of hydroxyl substituents and a fatty acid amide having a plurality of hydroxyl substituents; and, in some examples,
  a fourth layer, wherein the fourth layer is coloured.

Also disclosed herein is a collection of scratch-off structures. In some examples, at least some of the scratch-off structures comprise the following layers in order:
  a substrate having a first layer showing information thereon,
  a second layer comprising a polymeric film and being substantially transparent;
  a third layer comprising an electrostatic ink, which may be a transparent or a coloured electrostatic ink, wherein the electrostatic ink comprises a component selected from a fatty acid ester having a plurality of hydroxyl substituents and a fatty acid amide having a plurality of hydroxyl substituents; and, in some examples,
  a fourth layer, wherein the fourth layer is coloured, and wherein the information of the first layer of at least two of the scratch-off structures is different to one another.

The present disclosure relates to an electrostatic ink composition, which can be used in scratch-off structures and a method to produce scratch-off structures by using the electrostatic ink composition, as well as new scratch-off structures formed therefrom. Examples of the electrostatic ink composition allow the production of very effective scratch cards and other scratch-off structures. Some examples allow the variable information, the transparent electrostatic ink and the overlying coloured layer to all be printed by using electrostatic printing, making production of the scratch cards very fast and efficient. The inclusion of a particular additive, namely a component selected from a fatty acid ester having a plurality of hydroxyl substituents and a fatty acid amide having a plurality of hydroxyl substituents, in the transparent electrostatic ink reduces the adhesion between transparent electrostatic ink and a polymeric film. This adhesion has been found to be sufficiently weak that it allows removal of the transparent electrostatic ink and overlying layer(s) by scratching, yet it is sufficiently strong that gentle abrasion (e.g., in stacking or handling the structures) will not remove the transparent electrostatic ink and overlying layers.

Electrostatic Ink Composition

The electrostatic ink composition comprises a component selected from a fatty acid ester having a plurality of hydroxyl substituents and a fatty acid amide having a plurality of hydroxyl substituents. The electrostatic ink composition may or may not comprise a colorant. In some examples, the electrostatic ink composition comprises a colorant, which may be a colorant selected from black, magenta, cyan, yellow and white colorant.

In some examples, the electrostatic ink composition is a liquid electrostatic ink composition. In some examples, the liquid electrostatic ink composition may comprise:
a. a resin;
b. a carrier liquid; and
c. in some examples, a charge director and/or charge adjuvant.

The electrostatic ink composition may be a transparent electrostatic ink composition. The transparent electrostatic ink, which may also be termed a transparent electrostatic ink composition, may comprise a thermoplastic resin. It may further comprise a charge adjuvant and/or a charge director. The transparent electrostatic ink composition does not contain any pigment, or substantially lacks pigment and thus is a pigment-free composition or substantially pigment-free composition. The transparent electrostatic ink composition may otherwise be termed a colourless electrostatic ink composition or a colourless varnish for digital printing. The transparent electrostatic ink composition may comprise 5 wt % solids or less of colorant, in some examples, 3 wt % solids or less of colorant, in some examples, 1 wt % solids or less of colorant. "Colourant" may be a material that imparts a colour to the ink composition. As used herein, "colourant" includes pigments and dyes, such as those that impart colours, such as black, magenta, cyan, yellow and white to an ink. As used herein, "pigment" generally includes pigment colourants, magnetic particles, aluminas, silicas, and/or other ceramics or organometallics. Thus, though the present description primarily exemplifies the use of pigment colourants, the term "pigment" can be used more generally to describe not only pigment colourants, but also other pigments such as organometallics, ferrites, ceramics, and so forth.

The resin, which may be a thermoplastic resin, and the component selected from a fatty acid ester having a plurality of hydroxyl substituents and a fatty acid amide having a plurality of hydroxyl substituents together may constitute at least 85 wt % of the solids of the electrostatic ink composition, in some examples, at least 90 wt % of the solids of the electrostatic ink composition, in some examples, 95 wt % of the solids of the electrostatic ink composition.

The component selected from a fatty acid ester having a plurality of hydroxyl substituents and a fatty acid amide having a plurality of hydroxyl substituents may constitute at least 1 wt % of the solids of the electrostatic ink composition, in some examples, at least 2 wt % of the solids, in some examples, at least 3 wt % of the solids, in some examples, at least 5 wt % of the solids, in some examples, at least 7 wt % of the solids of the electrostatic ink composition.

The component selected from a fatty acid ester having a plurality of hydroxyl substituents and a fatty acid amide having a plurality of hydroxyl substituents may constitute 30 wt % or less of the solids of the electrostatic ink composition, in some examples, 25 wt % or less of the solids, in some examples, 20 wt % or less of the solids, in some examples, 18 wt % or less of the solids, in some examples, 17 wt % or less of the solids of the electrostatic ink composition.

The component selected from a fatty acid ester having a plurality of hydroxyl substituents and a fatty acid amide having a plurality of hydroxyl substituents may constitute from 1 wt % to 30 wt % of the solids of the electrostatic ink composition, in some examples from 3 wt % to 30 wt %, in some examples 5 wt % to 30 wt %, in some examples 5 wt % to 25 wt %, in some examples 5 wt % to 20 wt % of the solids of the electrostatic ink composition, in some examples 5 wt % to 15 wt % of the solids of the electrostatic ink composition, in some examples 5 wt % to 10 wt % of the solids of the electrostatic ink composition, in some examples 10 wt % to 20 wt % of the solids of the electrostatic ink composition, in some examples 15 wt % to 20 wt % of the solids of the electrostatic ink composition.

The electrostatic ink composition comprising the component selected from a fatty acid ester having a plurality of hydroxyl substituents and a fatty acid amide having a plurality of hydroxyl substituents may further comprise at least one additive such as surfactants, viscosity modifiers, emulsifiers and the like.

Fatty Acid Ester or a Fatty Acid Amide Having a Plurality of Hydroxyl Substituents The electrostatic ink composition comprises a component selected from a fatty acid ester having a plurality of hydroxyl substituents and a fatty acid amide having a plurality of hydroxyl substituents. In some examples, the electrostatic ink composition comprises a fatty acid ester having a plurality of hydroxyl substituents. In some examples, the electrostatic ink composition comprises a fatty acid amide having a plurality of hydroxyl substituents. For brevity, 'the component selected from a fatty acid ester having a plurality of hydroxyl substituents and a fatty acid amide having a plurality of hydroxyl substituents' will also be termed herein a release additive. In some examples, the release additive may comprise a mixture of fatty acid esters and/or a mixture of fatty acid amides. In some examples, the mixture of fatty acid esters may be derived from a vegetable oil, for example, castor oil.

In some examples, a plurality of hydroxyl substituents may comprise at least 2 hydroxyl substituents, in some examples at least 3 hydroxyl substituents.

In some examples, the fatty acid ester or fatty acid amide comprises at least one carbon chain comprising 4 to 40 carbon atoms, in some examples, 4 to 28 carbon atoms, in some examples, 6 to 26 carbon atoms, in some examples, 10 to 24 carbon atoms, in some examples, 12 to 20 carbon atoms, in some examples, 14 to 20 carbon atoms.

In some examples, the fatty acid ester or fatty acid amide may comprise or be derived from (e.g. formed by esterification or amidation of) saturated or unsaturated fatty acids, i.e. the fatty acid ester or fatty acid amide comprises a saturated or unsaturated carbon chain. In some examples, the fatty acid ester or fatty acid amide may comprise or be derived from (e.g. formed by esterification or amidation of) saturated fatty acids, i.e. comprise a saturated carbon chain.

In some examples, the fatty acid ester or fatty acid amide may comprise or be derived from (e.g. formed by esterification or amidation of) straight-chain, branched or cyclic fatty acids, i.e. having a straight-chain, branched or cyclic carbon chain. In some examples, the fatty acid ester or fatty acid amide may comprise or be derived from (e.g. formed by esterification or amidation of) straight-chain or branched fatty acids. In some examples, the fatty acid ester or fatty acid amide may comprise or be derived from (e.g. formed by esterification or amidation of) straight-chain fatty acids.

In some examples, the fatty acid ester is producible by esterification of at least one fatty acid with an alcohol. In some examples, the fatty acid ester is producible by esterification of a plurality fatty acids with a polyol. In some examples, the fatty acid ester is producible by esterification of two fatty acids with an alcohol having at least two hydroxy groups. In some examples, the fatty acid ester is producible by esterification of three fatty acids with an alcohol having at least three hydroxy groups.

In some examples, the fatty acid ester may comprise or be derived from a plurality of fatty acids, which may be the same or different. In other words, each fatty acid ester molecule can contain at least two different types of carbon chain, each of which is derived from a different fatty acid.

In some examples, the fatty acid ester may be a glyceride, in some examples, a monoglyceride, a diglyceride or a triglyceride. In some examples, the fatty acid ester is a di- or triglyceride. In some examples, the fatty acid ester is a triglyceride.

In some examples, each of the plurality of hydroxyl substituents may be substituents on one carbon chain. In other words, in some examples, the fatty acid ester or fatty acid amide may comprise a carbon chain having a plurality of hydroxyl substituents.

In some examples, each of the plurality of hydroxyl substituents may be substituents on different carbon chains. In other words, in some examples, the fatty acid ester or fatty acid amide may comprise a plurality of carbon chains, at least two of which each has at least one hydroxyl substituent.

In some examples, the fatty acid ester is a di- or triglyceride and each of the fatty acid chains (i.e. the carbon chains of the fatty acid) on the same molecule may be the same or different. In some examples, the fatty acid ester is a di- or triglyceride and each of the fatty acid chains (i.e. the carbon chains of the fatty acid) comprises at least one hydroxyl substituent. In some examples, the fatty acid ester is a di- or triglyceride and each of the fatty acid chains comprises one hydroxyl substituent.

In some examples, the fatty acid ester is a mono-, di- or triglyceride formed from saturated or unsaturated fatty acids. In some examples, the fatty acid ester is a mono-, di- or triglyceride formed from saturated fatty acids.

In some examples, the fatty acid ester is a mono-, di- or triglyceride that may comprise may comprise or be derived from straight-chain, branched or cyclic fatty acids or a mixture thereof. In some examples, the fatty acid ester is a mono-, di- or triglyceride that may comprise or be derived from a straight-chain or branched fatty acid or a mixture thereof. In some examples, the fatty acid ester is a mono-, di- or triglyceride comprising or derived from straight-chain fatty acids.

In some examples, the fatty acid ester may comprise an esterified monohydroxy fatty acid. In some examples, the fatty acid ester may comprise an esterified dihydroxy fatty acid.

In some examples, the fatty acid ester may comprise an esterified monohydroxyfatty acid, wherein the fatty acid may be selected from hydroxycaprylic acid, hydroxycapric acid, hydroxylauric acid, hydroxymyristic acid, hydroxypalmitic acid, hydroxystearic acid, hydroxyarachidic acid, hydroxybehenic acid, hydroxycerotic acid; and, in some examples, the esterified fatty acid may be a diglyceride or a triglyceride, i.e. the ester of glycerol and two of the fatty acids or three of the fatty acids, respectively. In some examples the fatty acid ester may comprise an esterified dihydroxyfatty acid, and the fatty acid may be selected from dihydroxycaprylic acid, dihydroxycapric acid, dihydroxylauric acid, dihydroxymyristic acid, dihydroxypalmitic acid, dihydroxystearic acid, dihydroxyarachidic acid, dihydroxybehenic acid, dihydroxycerotic acid; and, in some examples, the esterified fatty acid may be a monoglyceride, a diglyceride or a triglyceride, i.e. the ester of glycerol and one of the fatty acids, the ester of glycerol and two of the fatty acids, the ester of glycerol and three of the fatty acids, respectively.

In some examples, the fatty acid ester may comprise an ester of a fatty acid selected from ricinoleic acid, 12-hydroxystearic acid (i.e., hydrogenated ricinoleic acid), 10-hydroxystearic acid, 3-hydroxystearic acid, 12-hydroxylauric acid, 16-hydroxpalmitic acid, 2-hydroxypalmitic acid or 3-hydroxypalmitic acid, and, in some examples, the esterified fatty acid may be a diglyceride or a triglyceride, i.e. the ester of glycerol and two of the fatty acids or the ester of glycerol and three of the fatty acids, respectively. In some examples, the fatty acid ester may be selected from an an 9,10-dihydroxystearic acid, 9,12-dihydroxystearic acid and, in some examples, the esterified fatty acid may be a monoglyceride, a diglyceride or a triglyceride, i.e. the ester of glycerol and one of the fatty acids, the ester of glycerol and two of the fatty acids or the ester of glycerol and three of the fatty acids, respectively. In some examples, the fatty acid ester may comprise a mixture of any of these esterified fatty acids.

In some examples, the fatty acid ester may comprise an esterified saturated hydroxyl fatty acid, wherein the hydroxyl fatty acid may be selected from 2-hydroxyvaleric acid, 2-hydroxycaproic acid, 6-hydroxycaproic acid, 2-hydroxyenanthic acid, 7-hydroxyenanthic acid, 2-hydroxycaprylic acid, 3-hydroxycaprylic acid, 8-hydroxycaprylic acid, 2-hydroxypelargonic acid, 3-hydroxypelargonic acid, 9-hydroxypelargonic acid, 2-hydroxycapric acid, 3-hydroxycapric acid, 10-hydroxycapric acid, 2-hydroxyundecanoic acid, 3-hydroxyundecanoic acid, 11-hydroxyundecanoic acid, 2-hydroxylauric acid, 3-hydroxylauric acid, 12-hydroxylauric acid, 2-hydroxytridecanoic acid, 3-hydroxytridecanoic acid, 13-hydroxytridecanoic acid, 2-hydroxymyristic acid, 3-hydroxymyristic acid, 14-hydroxymyristic acid, 2-hydroxpentadecanoic acid, 3-hydroxypentadecanoic acid, 15-hydroxypentadecanoic acid, 2-hydroxpalmitic acid, 3-hydroxypalmitic acid, 16-hydroxypalmitic acid, 2-hydroxymargaric acid, 3-hydroxymargaric acid, 17-hydroxymargaric acid, 2-hydroxystearic acid, 3-hydroxystearic acid, 4-hydroxystearic acid, 5-hydroxystearic acid, 6-hydroxystearic acid, 7-hydroxystearic acid, 8-hydroxystearic acid, 9-hydroxystearic acid, 10-hydroxystearic acid, 11-hydroxystearic acid, 12-hydroxystearic acid, 13-hydroxystearic acid, 14-hydroxystearic acid, 15-hydroxystearic acid, 16-hydroxystearic acid, 17-hydroxystearic acid, 18-hydroxystearic acid, 2-hydroxynonadecanoic acid, 3-hydroxynonadecanoic acid, 19-hydroxynonadecanoic acid, 2-hydroxyarachic acid, 3-hydroxyarachic acid, 20-hydroxyarachic acid, 3-hydroxyheneicosanoic acid, 21-hydroxyheneicosanoic acid, 2-hydroxybehenic acid, 3-hydroxybehenic acid, 3-hydroxytricosanoic acid, 2-hydroxylignoceric acid, 3-hydroxylignoceric acid, 2-hydroxyhexacosanoic acid, 2-hydroxytriacontanoic acid, 2-hydroxytetratriacontanoic acid, 2-methyl-2-hydroxyenanthic acid, 2-methyl-3-hydroxypelargonic acid, 3-methyl-3-hydroxypelargonic acid, 2-methyl-3-hydroxycapric acid, 2-methyl-3-hydroxyundecanoic acid, 3-methyl-3-hydroxyundecanoic acid, 2-methyl-2-hydroxylauric acid, 2-methyl-3-hydroxylauric acid, 2-methyl-2-hydroxytridecanoic acid, 2-methyl-3-hydroxytridecanoic acid, 3-methyl-3-hydroxytridecanoic acid, 2-methyl-2-hydroxymyristic acid, 2-methyl-3-hydroxymyristic acid, 2-methyl-2-hydroxypentadecanoic acid, 2-methyl-3-hydroxypentadecanoic acid, 3-methyl-3-hydroxypentadecanoic acid, 2-methyl-2-hydroxypalmitic acid, 2-methyl-2-hydroxymargaric acid, 2-methyl-3-hydroxymargaric acid, 3-methyl-3-hydroxymargaric acid, 2-methyl-2-hydroxystearic acid, 2-methyl-2-hydroxynonadecanoic acid, 2-methyl-2-hydroxynonadecanoic acid, and 3-methyl-3-hydroxynonadecanoic acid, and, in some examples, the esterified fatty acid may be a monoglyceride, a diglyceride or a triglyceride, i.e. the ester of glycerol and one of the fatty acids, the ester of glycerol and two of the fatty acids or the ester of glycerol and three of the fatty acids, respectively.

In some examples, the fatty acid ester may comprise a vegetable oil or a hydrogenated vegetable oil. In some examples, the fatty acid ester may be selected from castor oil or castor oil, lesquerella oil, cosmos oil, and hydrogenated oils thereof. In some examples, the fatty acid ester may comprise a hydrogenated castor oil.

In some examples, the fatty acid amide may be a primary amide, a secondary amide or a tertiary amide. In some examples, the fatty acid amide may be a secondary amide or a tertiary amide. In some examples, the fatty acid amide may be a ceramide.

The component selected from a fatty acid ester having a plurality of hydroxyl substituents and a fatty acid amide having a plurality of hydroxyl substituents may be the reaction product resulting from the reaction between a fatty acid ester having a plurality of hydroxyl substituents, such as a hydrogenated castor oil, and an amine, such as an aliphatic diamine, which may be selected from 1,2-ethanediamine, 1,3-propane-diamine and 1,6-hexanediamine.

Liquid Carrier

In some examples, for example when printing, the electrostatic ink composition comprising the release additive and/or the coloured electrostatic ink composition of the fourth layer comprises a liquid carrier. The liquid carrier for the electrostatic ink composition comprising the release additive (which may be a transparent electrostatic ink composition) and the liquid carrier for the coloured electrostatic ink composition may be the same as one another or different from one another. Generally, the liquid carrier can act as a dispersing medium for the other components in the electrostatic ink composition. For example, the liquid carrier can comprise or be a hydrocarbon, silicone oil, vegetable oil, and so forth. The liquid carrier can include, but is not limited to, an insulating, non-polar, non-aqueous liquid that can be used as a medium for toner particles. The liquid carrier can include compounds that have a resistivity in excess of about $10^9$ ohm·cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before electrostatic printing, the liquid carrier can constitute about 20% to 99.5% by weight of the electrostatic ink composition comprising the component selected from a fatty acid ester having a plurality of hydroxyl substituents and a fatty acid amide having a plurality of hydroxyl substituents and/or the coloured electrostatic ink composition, in some examples, 50% to 99.5% by weight of the electrostatic ink composition the component selected from a fatty acid ester having a plurality of hydroxyl substituents and a fatty acid amide having a plurality of hydroxyl substituents and/or the coloured electrostatic ink composition. Before printing, the liquid carrier may constitute about 40 to 90% by weight of the electrostatic ink composition comprising the component selected from a fatty acid ester having a plurality of hydroxyl substituents and a fatty acid amide having a plurality of hydroxyl substituents and/or the coloured electrostatic ink composition. Before printing, the liquid carrier may constitute about 60% to 80% by weight of the electrostatic ink composition comprising the component selected from a fatty acid ester having a plurality of hydroxyl substituents and a fatty acid amide having a plurality of hydroxyl substituents and/or the coloured electrostatic ink composition. Before printing, the liquid carrier may constitute about 90% to 99.5% by weight of the electrostatic ink composition comprising the component selected from a fatty acid ester having a plurality of hydroxyl substituents and a fatty acid amide having a plurality of hydroxyl substituents and/or the coloured electrostatic ink composition, in some examples, 95% to 99% by weight of the electrostatic ink composition comprising the component selected from a fatty acid ester having a plurality of hydroxyl substituents and a fatty acid amide having a plurality of hydroxyl substituents and/or the coloured electrostatic ink composition.

The electrostatic ink composition comprising the component selected from a fatty acid ester having a plurality of hydroxyl substituents and a fatty acid amide having a plurality of hydroxyl substituents and/or the coloured electrostatic ink, when electrostatically printed, may be substantially free from liquid carrier. In an electrostatic printing process and/or afterwards, the liquid carrier may be removed, for example, by an electrophoresis processes during printing and/or evaporation, such that substantially just solids are transferred to the print substrate (in the present context, when printed on the second or third layer, as appropriate). Substantially free from liquid carrier may indicate that the ink printed on the print substrate contains less than 5 wt % liquid carrier, in some examples, less than 2 wt % liquid carrier, in some examples, less than 1 wt % liquid carrier, in some examples, less than 0.5 wt % liquid carrier. In some examples, the ink printed on the print substrate is free from liquid carrier.

Thermoplastic Resin

The electrostatic ink composition comprising the release additive (which may be a transparent electrostatic ink composition) and/or the coloured electrostatic ink composition may include a thermoplastic resin, referred to as the resin. A thermoplastic polymer is sometimes referred to as a thermoplastic resin. The resin for the electrostatic ink composition comprising the release additive (which may be a transparent electrostatic ink composition) and the resin for the coloured electrostatic ink composition may be the same as one another or different from one another.

The resin typically includes a polymer. The resin can include, but is not limited to, a thermoplastic polymer. In some examples, the polymer of the resin may be selected from ethylene acrylic acid copolymers; ethylene methacrylic acid copolymers; ethylene vinyl acetate copolymers; copolymers of ethylene (e.g., 80 wt % to 99.9 wt %), and alkyl (e.g., C1 to C5) ester of methacrylic or acrylic acid (e.g., 0.1 wt % to 20 wt %); copolymers of ethylene (e.g., 80 wt % to 99.9 wt %), acrylic or methacrylic acid (e.g., 0.1 wt % to 20.0 wt %) and alkyl (e.g., C1 to C5) ester of methacrylic or acrylic acid (e.g., 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is, in some examples, from 1 to about 20 carbon atoms, such as methyl methacrylate (e.g., 50 wt % to 90 wt %)/methacrylic acid (e.g., 0 wt % to 20 wt %)/ethylhexylacrylate (e.g., 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. Acidity of a polymer, as measured in mg KOH/g can be measured by using standard procedures known in the art, for example, using the procedure described in ASTM D1386.

The resin may comprise a polymer, in some examples, a polymer having acidic side groups, that has a melt flow rate of less than about 60 g/10 minutes, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the particles each individually have a melt flow rate of 90 g/10 minutes or less, in some examples, 80 g/10 minutes or less, in some examples, 80 g/10 minutes or less, in some examples, 70 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to 40 g/10 minutes, in some examples, 20 g/10 minutes to 30 g/10 minutes. The polymer having acidic side groups can have a melt flow rate of, in some examples, about 50 g/10 minutes to about 120 g/10 minutes, in some examples, 60 g/10 minutes to about 100 g/10 minutes. The melt flow rate can be measured by using standard procedures known in the art, for example, as described in ASTM D1238.

The acidic side groups may be in free acid form or may be in the form of an anion and associated with at least one counterion, typically metal counterions, for example, a metal selected from the alkali metals, such as lithium, sodium and potassium, alkali earth metals, such as magnesium or calcium, and transition metals, such as zinc. The polymer having acidic side groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g., Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitutes from 5 wt % to about 25 wt % of the copolymer, in some examples, from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g., 92 to 85 wt %, in some examples, about 89 wt %) and acrylic or methacrylic acid (e.g., 8 to 15 wt %, in some examples, about 11 wt %) having a melt flow rate of 80 to 110 g/10 minutes and a second polymer that is a co-polymer of ethylene (e.g., about 80 to 92 wt %, in some examples, about 85 wt %) and acrylic acid (e.g., about 18 to 12 wt %, in some examples, about 15 wt %) having a melt viscosity lower than that of the first polymer, the second polymer, for example, having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. Melt viscosity can be measured by using standard techniques. The melt viscosity can be measured by using a rheometer, for example, a commercially available AR-2000 Rheometer from Thermal Analysis Instruments, by using the geometry of: 25 mm steel plate-standard steel parallel plate, and finding the plate over plate rheometry isotherm at 120° C., 0.01 Hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples, about 4:1.

The resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The resin may comprise a first polymer having a melt viscosity of 15000 poise or more, in some examples, 20000 poise or more, in some examples, 50000 poise or more, in some examples, 70000 poise or more; and in some examples, the resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. The resin may comprise a first polymer having a melt viscosity of 60000 poise or more, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of resin polymer, the resin polymer (excluding any other components of the electrostatic ink composition) may have a melt viscosity of 6000 poise or more, in some examples, a melt viscosity of 8000 poise or more, in some examples, a melt viscosity of 10000 poise or more, in some examples, a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured by using standard techniques. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g., Zn, Na, Li) such as SURLYN® ionomers. The resin may comprise (i) a first polymer that is a copolymer of ethylene and an ethylenically unsaturated acid of either acrylic acid or methacrylic acid, wherein the ethylenically unsaturated acid of either acrylic or methacrylic acid constitutes from 8 wt % to about 16 wt % of the copolymer, in some examples, 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples, from 14 wt % to about 20 wt % of the copolymer, in some examples, from 16 wt % to about 20 wt % of the copolymer, in some examples, from 17 wt % to 19 wt % of the copolymer.

In an example, the thermoplastic resin constitutes about 10 to 99%, in some examples, about 15 to 95%, by weight of the solids of the electrostatic ink composition comprising the release additive (which may be a transparent electrostatic ink composition) and/or the coloured electrostatic ink composition. In another example, the resin constitutes about 20 to 95% by weight of the solids of the electrostatic ink composition comprising the release additive (which may be a transparent electrostatic ink composition) transparent and/or the coloured electrostatic ink composition. In another example, the resin constitutes about 25 to 95% by weight of the solids of the electrostatic ink composition comprising the release additive (which may be a transparent electrostatic ink composition) and/or the coloured electrostatic ink composition. In another example, the resin constitutes about 35 to 95% by weight, in some examples, from 75 to 95% by weight, of the solids of the electrostatic ink composition comprising the release additive (which may be a transparent electrostatic ink composition) and/or the coloured electrostatic ink composition. In another example, the resin constitutes about 35 to 95% by weight, in some examples, from 75 to 99% by weight of the solids of the electrostatic ink composition comprising the release additive (which may be a transparent electrostatic ink composition) and/or the coloured electrostatic ink composition.

The thermoplastic resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a copolymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples, an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples, 5 to 40% by weight, in some examples, 5 to 20% by weight of the copolymer, in some examples, 5 to 15% by weight of the copolymer. The second monomer may constitute 1 to 50% by weight of the co-polymer, in some examples, 5 to 40% by weight of the co-polymer, in some examples, 5 to 20% by weight of the co-polymer, in some examples, 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, for example, the total amount of the polymer or polymers having acidic side groups and polymer having ester side groups. The polymer having ester side groups may constitute 5% or more by weight of the total amount of the resin polymers in the resin, in some examples, 8% or more by weight of the total amount of the resin polymers in the resin, in some examples, 10% or more by weight of the total amount of the resin polymers in the resin, in some examples, 15% or more by weight of the total amount of the resin polymers in the resin, in some examples, 20% or more by weight of the total amount of the resin polymers in the resin, in some examples, 25% or more by weight of the total amount of the resin polymers in the resin, in some examples, 30% or more by weight of the total amount of the resin polymers in the resin, in some examples, 35% or more by weight of the total amount of the resin polymers in the resin. The polymer having ester side groups may constitute from 5 to 50% by weight of the total amount of the resin polymers in the resin, in some examples 10 to 40% by weight of the total amount of the resin polymers in the resin, in some examples 15 to 30% by weight of the total amount of the polymers in the resin.

The polymer having ester side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more. The polymer having ester side groups may have an acidity of 100 mg KOH/g or less, in some examples, 90 mg KOH/g or less. The polymer having ester side groups may have an acidity of 60 mg KOH/g to 90 mg KOH/g, in some examples, 70 mg KOH/g to 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

In an example, the polymer or polymers of the resin can be selected from the Nucrel family of toners (e.g., Nucrel 403™, Nucrel 407™, Nucrel 609HS™, Nucrel 908HS™ Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g., Aclyn 201, Aclyn 246, Aclyn 285, and Aclyn 295), and the Lotader family of toners (e.g., Lotader 2210, Lotader, 3430, and Lotader 8200 (sold by Arkema)).

Charge Director and Charge Adjuvant

In some examples, the electrostatic ink composition comprising the release additive (which may be a transparent electrostatic ink composition) and/or the coloured electrostatic ink composition includes either a charge director or a charge adjuvant or both.

The charge director may be added in order to impart and/or maintain sufficient electrostatic charge on ink particles during electrostatic printing, which may be particles comprising the thermoplastic resin and the release additive (for the electrostatic ink composition comprising the release additive, which may be a transparent electrostatic ink composition), or the colorant (for the coloured electrostatic ink composition). The charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, and so forth. The charge director can be selected from, but is not limited to, oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

In some examples, the electrostatic ink composition comprising the release additive (which may be a transparent electrostatic ink composition) and/or the coloured electrostatic ink composition comprises a charge director comprising a simple salt. Simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, $NH_4$, tert-butyl ammonium, $Li^+$, and $Al^{3+}$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, $LiTFA$, $Al_2(SO_4)_3$, $LiClO_4$ and $LiBF_4$, or any sub-group thereof.

The charge director may include at least one of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulfonate salt is dodecyl benzene sulfonic acid isopropyl amine, which is available from Croda.

In some examples, the electrostatic ink composition comprising the release additive (which may be a transparent electrostatic ink composition) and/or the coloured electrostatic ink composition comprises a charge director comprising a sulfosuccinate salt of the general formula $MA_n$, wherein M is a metal, n is the valence of M, and A is an ion of the general formula (I):

$$[R^1-O-C(O)CH_2CH(SO_3^-)C(O)-O-R^2]^- \quad (I)$$

wherein each of $R^1$ and $R^2$ is an alkyl group.

The sulfosuccinate salt of the general formula $MA_n$ is an example of a micelle forming salt. The charge director may be substantially free of or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more.

In the formula [$R_1-O-C(O)CH_2CH(SO_3^-)C(O)-O-R_2$], in some examples, each of $R^1$ and $R^2$ is an aliphatic alkyl group. In some examples, each of $R^1$ and $R^2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R^1$ and $R^2$ are the same. In some examples, at least one of $R^1$ and $R^2$ is $C_{13}H_{27}$. In some examples, M is Na, K, Cs, Ca, or Ba.

In some examples, the charge director constitutes about 0.001 to 20% by weight, in some examples, 0.01 to 20% by weight, in some examples, 0.01 to 10% by weight, in some examples, 0.01 to 1% by weight of the solids of the electrostatic ink composition comprising the release additive (which may be a transparent electrostatic ink composition) and/or the coloured electrostatic ink composition. In some examples, the charge director constitutes about 0.001 to 0.15% by weight of the solids of the electrostatic ink composition comprising the release additive (which may be a transparent electrostatic ink composition) and/or the coloured electrostatic ink composition, in some examples, 0.001 to 0.15%, in some examples, 0.001 to 0.02% by weight of the solids of the electrostatic ink composition comprising the release additive (which may be a transparent electrostatic ink composition) and/or the coloured electrostatic ink composition, in some examples, 0.1 to 2% by weight of the solids of the electrostatic ink composition comprising the release additive (which may be a transparent electrostatic ink composition) and/or the coloured electrostatic ink composition, in some examples, 0.2 to 1.5% by weight of the solids of the electrostatic ink composition comprising the release additive (which may be a transparent electrostatic ink composition) and/or the coloured electrostatic ink composition, in some examples, 0.1 to 1% by weight of the solids of the electrostatic ink composition comprising the release additive (which may be a transparent electrostatic ink composition) and/or the coloured electrostatic ink composition, in some examples, 0.2 to 0.8% by weight of the solids of the electrostatic ink composition comprising the release additive (which may be a transparent electrostatic ink composition) and/or the coloured electrostatic ink composition. In some examples, the charge director is present in an amount of at least 1 mg of charge director per gram of solids of the electrostatic ink composition comprising the release additive (which may be a transparent electrostatic ink composition) and/or the coloured electrostatic ink composition (which will be abbreviated to mg/g), in some examples, at least 2 mg/g, in some examples, at least 3 mg/g, in some examples, at least 4 mg/g, in some examples, at least 5 mg/g. In some examples, the charge director is present in the amounts stated above, and the charge director is present in an amount of from 1 mg to 50 mg of charge director per gram of solids of the electrostatic ink composition comprising the release additive (which may be a transparent electrostatic ink composition) and/or the coloured electrostatic ink composition (which will be abbreviated to mg/g), in some examples, from 1 mg/g to 25 mg/g, in some examples, from 1 mg/g to 20 mg/g, in some examples, from 1 mg/g to 15 mg/g, in some examples, from 1 mg/g to 10 mg/g, in some examples, from 3 mg/g to 20 mg/g, in some examples, from 3 mg/g to 15 mg/g, in some examples, from 5 mg/g to 10 mg/g.

A charge adjuvant may promote charging of the particles when a charge director is present in the electrostatic ink composition comprising the release additive (which may be a transparent electrostatic ink composition) and/or the coloured electrostatic ink composition during printing. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples, about 0.1 to 1% by weight, in some examples, about 0.3 to 0.8% by weight of the solids of the electrostatic ink composition comprising the release additive (which may be a transparent electrostatic ink composition) and/or the coloured electrostatic ink composition, in some examples, about 1 to 3% by weight of the solids of the electrostatic ink composition comprising the release additive (which may be a transparent electrostatic ink composition) and/or the coloured electrostatic ink composition, in some examples, about 1.5 to 2.5% by weight of the solids of the electrostatic ink composition comprising the release additive (which may be a transparent electrostatic ink composition) and/or the coloured electrostatic ink composition.

In some examples, the electrostatic ink composition comprising the release additive (which may be a transparent electrostatic ink composition) and/or the coloured electrostatic ink composition further includes, for example, as a charge adjuvant, a salt of a multivalent cation and a fatty acid anion. The salt of a multivalent cation and a fatty acid anion can act as a charge adjuvant. The multivalent cation may, in some examples, be a divalent or a trivalent cation. In some examples, the multivalent cation is selected from Group 2, transition metals, Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a $C_8$ to $C_{26}$ fatty acid anion, in some examples, a $C_{14}$ to $C_{22}$ fatty acid anion, in some examples, a $C_{16}$ to $C_{20}$ fatty acid anion, in some examples, a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition comprising the release additive (which may be a transparent electrostatic ink composition) and/or the coloured electrostatic ink composition, in some examples, in an amount of 0.1 wt % to 2 wt % of the solids of the electrostatic ink composition comprising the release additive (which may be a transparent electrostatic ink composition) and/or the coloured electrostatic ink composition, in some examples, in an amount of 0.1 wt % to 2 wt % of the solids of the electrostatic ink composition comprising the release additive (which may be a transparent electrostatic ink composition) and/or the coloured electrostatic ink composition, in some examples, in an amount of 0.3 wt % to 1.5 wt % of the solids of the electrostatic ink composition comprising the release additive (which may be a transparent electrostatic ink composition) and/or the coloured electrostatic ink composition, in some examples, about 0.5 wt % to 1.2 wt % of the solids of the electrostatic ink composition comprising the release additive (which may be a transparent electrostatic ink composition) and/or the coloured electrostatic ink composition, in some examples, about 0.8 wt % to 1 wt % of the solids of the electrostatic ink composition comprising the release additive (which may be a transparent electrostatic ink composition) and/or the coloured electrostatic ink composition, in some examples, about 1 wt % to 3 wt % of the solids of the electrostatic ink composition comprising the release additive (which may be a transparent electrostatic ink composition) and/or the coloured electrostatic ink composition, in some examples, about 1.5 wt % to 2.5 wt % of the solids of the electrostatic ink composition comprising the release additive (which may be a transparent electrostatic ink composition) and/or the coloured electrostatic ink composition.

Other Additives

The electrostatic ink composition comprising the release additive (which may be a transparent electrostatic ink composition) and/or the coloured electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, for example, from an intermediate transfer member, which may be a heated blanket.

Substrate Having a First Layer Showing Information Thereon

The substrate having a first layer may be or comprise any suitable material for supporting the second to fourth layers. The first layer may, for example, be or comprise any suitable material capable of having information displayed, for example, printed, thereon. The first layer may comprise a material selected from an organic or inorganic material. The first layer may comprise a natural polymeric material, for example, cellulose. The first layer may comprise a synthetic polymeric material, for example, a plastic. The first layer may comprise a polymer formed from alkylene monomers, including, but not limited to, polyethylene and polypropylene, and copolymers such as styrene-polybutadiene. The polypropylene may be biaxially orientated polypropylene. The material may comprise a metal, which may be in sheet form. The metal may be selected from or made from, for instance, aluminum (Al), silver (Ag), tin (Sn), copper (Cu), or mixtures thereof. In some examples, the substrate comprises a cellulosic paper, card or cardboard. In some examples, the cellulosic paper is coated with a polymeric material, for example, a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate may be a cellulosic print substrate, such as paper. The cellulosic substrate may be a coated cellulosic print substrate, for example, having a coating of a polymeric material thereon.

The information on the first layer may comprise any indicia, for example, indicia selected from pictures, words, symbols, characters, letters and/or numbers. The pictures, words, symbols, characters, letters and/or numbers may be from any language, alphabet or numbering system. In a collection of scratch-off structures, the information underlying the second, third and fourth layers may vary, that is, such that different scratch-off structures display different information that can be revealed when the third and fourth layer are scratched off. The first layer may also comprise other information, in locations other than under the third and fourth layers, and this information may be the same in the collection of scratch-off structures.

The information may be printed on the first layer, and may be printed by any suitable print method, including, but not limited to electrostatic printing, ink-jet printing and offset lithography. The information may be printed and comprise a colourant selected from cyan, magenta, yellow, black and white. The information on the first layer may be printed using the electrostatic printing of a coloured electrostatic ink, which may be as described herein for the fourth layer.

In some examples, an electrostatic ink comprising a component selected from a fatty acid ester having a plurality of hydroxyl substituents and a fatty acid amide having a plurality of hydroxyl substituents is printed on the first layer, and in some examples, one or more further layers are disposed between the printed electrostatic ink and the first layer. The electrostatic ink comprising a component selected from a fatty acid ester having a plurality of hydroxyl substituents and a fatty acid amide having a plurality of hydroxyl substituents may be a coloured ink, e.g. containing one or more pigments, or a transparent electrostatic ink, e.g. lacking or substantially lacking a pigment.

Second Layer

A second layer may overlie the first layer. The second layer may comprise a polymeric film and/or be substantially transparent. "Substantially transparent" in the present context indicates that the information on the first layer is visible through the second layer. "Visible through the second layer" may indicate that it can be seen by a human from 30 cm, the human having a visual acuity of 1.0, as measured in accordance with ISO 8596.

The second layer typically acts as a protective layer over the information on the first layer, such that on scratching the third and fourth layers off, the second layer remains in place. The second layer may have a higher abrasion resistance, for example, as tested by using a suitable test, such as ASTM D5181-09, than the third and/or fourth layer.

The polymeric film of the second layer may, for example, have been formed from or be an overprint varnish or primer. Such overprint varnishes are typically applied as protective layers over printed surfaces. An overprint varnish may be applied in liquid form, then cured and/or hardened, with solvent evaporation as appropriate to leave the solid overprint varnish. The overprint varnish may be selected from a UV-curable varnish, an aqueous-based varnish, and a solvent-based varnish. The solvent-based varnish may comprise a vinyl acetate-based resin, an acrylic-based resin, a polyvinyl butyral (PVB)-based resin or a wax-based resin, such as oil-based alkyd resins. The water-based varnish may comprise a resin based on a styrenic binding system and/or an acrylic binding system. In some examples, the water-based varnish comprises a vinyl acrylic resin, such as a polyacrylic acid copolymer, such as an ethylene acrylic acid copolymer. The UV-curable varnish may contain polymers and/or monomers that cure, for example, further polymerise and/or cross-link, when exposed to UV radiation.

The second layer may comprise a polymeric film adhered to the first layer. In some examples, the polymeric film is substantially transparent.

In some examples, the polymeric film may be or comprises a sheet of plastic. The sheet of plastic may be a continuous sheet. The sheet of plastic may be a non-porous sheet of plastic.

The polymeric film may be or comprise a monoaxially stretched or biaxially stretched plastic. In some examples, the polymeric film may comprise a single layer of material, which may comprise or be plastic, or a plurality of layers of material, each of which may comprise or be plastic, and may be different to one another.

In some examples, the polymeric film is in the form of a sheet, in some examples, a sheet of plastic, having a thickness of at least 5 µm, in some examples, at least 10 µm, in some examples, at least 30 µm, in some examples, at least 40 µm. In some examples, the polymeric film is in the form of a sheet having a thickness of from 5 µm to 1 mm, in some examples, 5 µm to 200 µm, in some examples, 5 µm to 100 µm, in some examples, 10 µm to 80 µm, in some examples, 10 µm to 60 µm, in some examples, 10 µm to 30 µm, in some examples, 20 µm to 60 µm, in some examples, 30 µm to 50 µm.

In some examples, the polymeric film comprises a plastic selected from a polyalkylene, polyethylene terephthalate, polyethylene terephthalate glycol, polystyrene, polyvinyl chloride, polyethylene-2,6-napthalate, polyhexamethylene adipamide, polymers of alpha mono-olefinically unsaturated hydrocarbons having polymer producing unsaturation such as butene, vinyl acetate, methylacrylate, 2-ethyl hexyl acrylate, isoprene, butadiene acrylamide, ethylacrylate and N-methyl-n-vinyl acetamide. In some examples, the polymeric film comprises a plastic selected from polyethylene, polypropylene, polyisopropylethylene and polyisobutylethylene.

In some examples, the polymeric film comprises a monoaxially or biaxially oriented sheet of plastic. In some examples, the polymeric film comprises a plastic selected from an oriented polypropylene and an oriented polyethylene. In some examples, the plastic of the polymeric film is selected from monoaxially oriented polypropylene, biaxially oriented polypropylene, monoaxially oriented polyethylene and biaxially oriented polyethylene.

The polymeric film may be adhered to the first layer by an adhesive or by direct fusing of the materials of the first and second layers. In an example, the adhesive is a thermally fusible adhesive. In an example, the adhesive is a hot-melt adhesive. In an example, the adhesive is a pressure-sensitive adhesive. The adhesive may be selected from ethylene vinyl acetate (EVA), polyethylene, polystyrene, polypropylene, polybutene, polyester, poly(meth)acrylate, polyamides, thermoplastic polyimides, polyesters, polyurethanes, styrene block co-polymers (such as styrene-butadiene-styrene, styrene-isoprene-styrene, styrene-ethylene/butylene-styrene and styrene-ethylene/propylene).

In some examples, the polymeric film is present with a coat weight of at least 0.1 grams per square meter (gsm), in some examples at least 0.3 gsm, in some examples at least 0.5 gsm, in some examples at least 1.5 gsm. In some examples, the polymeric film is present with a coat weight of 10 grams per square meter (gsm) or less, in some examples 7 gsm or less, in some examples 5 gsm or less, in some examples at least 3 gsm or less, in some examples at least 3 gsm or less. In some examples, the polymeric film is present with a coat weight of at least 0.1 grams per square meter (gsm) to 10 gsm, in some examples 0.3 gsm to 5 gsm, in some examples 0.5 gsm to 3 gsm, in some examples 1 gsm to 2 gsm, in some examples about 1.5 gsm.

Third Layer

In some examples, an electrostatic ink comprising a component selected from a fatty acid ester having a plurality of hydroxyl substituents and a fatty acid amide having a plurality of hydroxyl substituents is printed on the second layer. The electrostatic ink comprising a component selected from a fatty acid ester having a plurality of hydroxyl substituents and a fatty acid amide having a plurality of hydroxyl substituents may be a coloured ink, e.g. containing one or more pigments, or a transparent electrostatic ink, e.g. lacking or substantially lacking a pigment. A fourth layer may or may not be disposed on the third layer.

The third layer may comprise an electrostatic ink comprising the release additive, wherein the release additive selected from a fatty acid ester having a plurality of hydroxyl substituents and a fatty acid amide having a plurality of hydroxyl substituents. In some examples, the electrostatic ink is a transparent electrostatic ink. "Transparent" in the present context indicates that the information on the first layer is visible through the second layer and the third layer. "Visible through the second layer and the third layer" may indicate that it can be seen by a human from 30 cm, the human having a visual acuity of 1.0, as measured in accordance with ISO 8596. In some examples, the electrostatic ink is a liquid electrostatic ink.

In some examples, the third layer, once printed, may form a layer of 10 µm or less in thickness, for example, 9 µm or less in thickness, 8 µm or less in thickness, 7 µm or less in thickness, 6 µm or less in thickness, 5 µm or less in thickness, 4 µm or less in thickness, 3 µm or less in thickness, 2 µm or less in thickness, 1.5 µm or less in thickness. In some examples, the transparent electrostatic ink composition is about 1 µm in thickness.

In some examples, the third layer, once printed, the transparent electrostatic ink composition forms a layer of 0.1 µm or greater in thickness, for example, 0.2 µm or greater in thickness, 0.3 µm or greater in thickness, 0.4 µm or greater in thickness, 0.5 µm or greater in thickness, 0.6 µm or greater in thickness, 0.7 µm or greater in thickness, 0.8 µm or greater in thickness, 0.9 µm or greater in thickness.

Fourth Layer

The fourth layer is a coloured layer. In some examples, the fourth layer acts to obscure the information on the first layer, but can be scratched off, typically with the third layer, to reveal the underlying information on the first layer. The fourth layer may be a printed layer, and may be printed by any suitable print method, including, but not limited to electrostatic printing, ink-jet printing and offset lithography. The fourth layer may comprise a colourant which may be selected from cyan, magenta, yellow, black and white colourants.

In some examples, the fourth layer comprises a coloured electrostatic ink, printed in an electrostatic printing process, which may be a dry or a liquid electrostatic printing process. The coloured electrostatic ink may comprise a colourant selected from cyan, magenta, yellow, black and white. The coloured electrostatic ink may comprise colourant in at least 5 wt % of the solids, in some examples, at least 8 wt % of the solids, in some examples, at least 10 wt % of the solids, in some examples, at least 10 wt % of the solids. The coloured electrostatic ink, which may also be termed a coloured electrostatic ink composition, may comprise a thermoplastic resin, which may be the same as or different from any thermoplastic resin that the transparent electrostatic ink contains.

The coloured electrostatic ink may substantially lack (e.g., contain less than 1 wt % of the solids) or lack the release additive as described herein, i.e. the component selected from a fatty acid ester having a plurality of hydroxyl substituents and a fatty acid amide having a plurality of hydroxyl substituents.

In some examples, some of the coloured material of the fourth layer may be printed directly onto the second layer. In some examples, the coloured material of the fourth layer extends beyond the third layer, such that it directly contacts the second layer.

In some examples, the coloured electrostatic ink composition comprises a pigment and all components of the transparent electrostatic ink composition described above except the release additive.

Scratch-Off Structure

The present disclosure provides a scratch-off structure comprising, in some examples, the following layers in order:
 a substrate having a first layer showing information thereon,
 a second layer comprising a polymeric film and being substantially transparent;
 a third layer comprising a transparent electrostatic ink;
 a fourth layer, wherein the fourth layer is coloured.

The scratch-off structure may have been produced by the method described herein, and may comprise the components mentioned for each layer herein.

As indicated, FIG. 1 schematically depicts a cross-section of an example of a scratch-off structure before (a) and after (b) the third and fourth layers have been scratched off.

FIGS. 2(a) to (c) shows schematically an example of a scratch-off structure being produced and then having a portion scratched off to reveal information.

FIG. 1a shows a cross-sectional diagram of an example scratch-off structure (100). The scratch-off structure comprises a substrate (101a) having a first layer showing information (101b) thereon. A second layer comprising a polymeric film (102) and being substantially transparent is disposed on the substrate (101a) having a first layer showing information (101b) thereon. A transparent third layer (103) comprising a transparent electrostatic ink having the release additive as described herein is disposed on the second layer (102) over at least the area covered by the information (101b) shown on the substrate (101a). A fourth, coloured, layer (104) is disposed on the third layer (103) and in some examples on any areas of the second layer (102) not covered by the third layer (103). The fourth coloured layer obscures the information on the first layer.

FIG. 1b shows a cross-sectional diagram of the scratch-off structure (100) shown in FIG. 1a after the scratch-off portions (the third and fourth layers) have been scratched off. The adhesion of the third layer (103) to the second layer (102) is low enough that the third layer and any layers, such as the fourth layer (104), adhered to it can be removed by use of abrasion, such as scratching with a coin, finger nail, or other suitable object. The removal of the third (103) and fourth (104) layers allows the information (101b) shown on the substrate (101a) to become visible.

Figure 2:
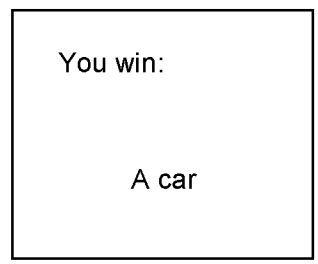
FIG. 2(a) to (c) shows schematically an example of a scratch-off structure being produced and then having a portion scratched off to reveal information.
Figure 2:
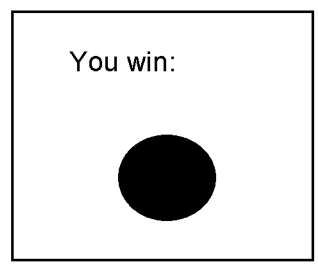
Figure 2:

FIG. 2 shows schematically an example of a scratch-off structure, when viewing from above the layers. FIG. 2a depicts an example of the substrate having a first layer showing information (in this case the phrase "You win: A car"). FIG. 2b depicts a scratch-off structure in which a third layer comprising a transparent electrostatic ink has been printed in a circular portion over part of the information ("a car") shown on the substrate and over which has been printed an opaque circle, forming a part of the fourth, coloured, layer. The remaining part of the fourth layer has been printed directly onto the second layer comprising a polymeric film, providing the background pattern. In some examples, this background pattern may have formed part of the substrate showing information and consequently may be beneath the second layer. FIG. 2c depicts the scratch-off structure once the surface has been scratched and the third and fourth layers have been partially removed from the second layer, revealing the information ("A car"). Additional scratching would result in complete removal of the third layer and overlying fourth layer, removing the entire opaque circle.

EXAMPLES

The following illustrates examples of the electrostatic ink composition, method of producing a scratch-off structure, scratch-off structures and related aspects described herein. Thus, these examples should not be considered to restrict the present disclosure, but are merely in place to teach how to make examples of the electrostatic ink composition and scratch-off structure of the present disclosure.

Materials

Release additive (a fatty acid ester having a plurality of hydroxyl substituents):

Efka RM 1920 (BASF): a modified hydrogenated castor oil, which contains a mixture of fatty acid esters in the form of glycerides at least a proportion of which are triglycerides.

Resins

Nucrel® 699 (Dupont): a copolymer of ethylene and methacrylic acid, made with nominally 11 wt % methacrylic acid.

AC-5120 (Honeywell): ethylene—acrylic acid copolymer with an acid number of 112-130 KOH/g.

Grinding Agent

Aluminium stearate (Sigma-Aldrich)

Carrier Liquid

Isopar L (available form EXXON): an isoparafinic oil.

Charge Adjuvant

VCA (available from Sigma—Aldrich): an aluminium stearate.

Charge Director

NCD: a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

Over Print Varnishes

Digiguard® Gloss 210 and Digiguard® Gloss 215 (Michelman): a water-based overprint varnish Example 1—Preparation of the Transparent Liquid Electrostatic Ink Containing the Release Additive A transparent paste (25 wt % solids) was formed by mixing the resins Nucrel® 699 and AC-5120 (ratio of 4:1) with EfkaRM1920 (5-25 wt % of the solids) and grinding agent (1.5 wt % of the solids in Isopar L. The paste was ground in an attritor SO (from Union Process USA) at 25° C. for 24 h to form a concentrated transparent ink paste.

The ground paste was diluted to 2 wt % solids with Isopar L and a charge director (5-8 mL of HP Indigo Imaging Agent (such that the charge director constituted approximately 0.1 wt % to 0.3 wt % of the solids of the electrostatic ink composition) was added to form a transparent electrostatic ink. The transparent electrostatic ink was left overnight before printing.

Example 2—Preparation of Scratch Off Structures

Information, in the form of words, letters, images or any combination thereof, was printed onto a paper substrate (300 g Condat paper) by using an HP Indigo 7000 printing press to form a first layer showing information.

DigiGuard® Gloss 215 (from Michelman, Inc), a transparent varnish, was applied over the first layer by using drawdown rod #0 (designed to apply 0.2 gsm layer; from Diversified Enterprises, USA), forming a second layer overlying the first layer.

The transparent liquid electrostatic ink produced in Example 1 was printed over the combined first and second layers by using an HP Indigo 7000printing press to form a third layer on top of the second layer, such that the third layer covered at least the portion of the first layer showing information.

Finally, a fourth layer, comprising several coloured liquid electrostatic inks was printed over the third layer by using an HP Indigo 7000 printing press, providing an opaque layer through which the information printed on the paper substrate cannot be perceived. In this Example, the fourth layer comprises 200% black, 200% white and 100% magenta inks (HP Indigo ElectroInk® 4.5).

Comparative Examples—Scratch-Off Structures without Varnish Layer

Comparative scratch-off substrates were prepared by following the procedure disclosed in Example 2 omitting the second layer, that is, the DigiGuard® Gloss varnish layer.

Example 3—Correlation Between Scratchability of the Image and Amount of Release Additive in the Transparent Ink The effect of the amount of the release additive in the transparent electrostatic ink composition on the scratchability of the transparent electrostatic ink was examined by scratch testing.

A test was performed by using a Model 551 Shear/Scratch testing apparatus (from Taber®). The printed samples were dried at 80° C. for 4 h prior the testing to avoid "slipping" of the scratching needle. The weight of debris removed by scratching at a pressure of 50 g was measured.

Figure 3:
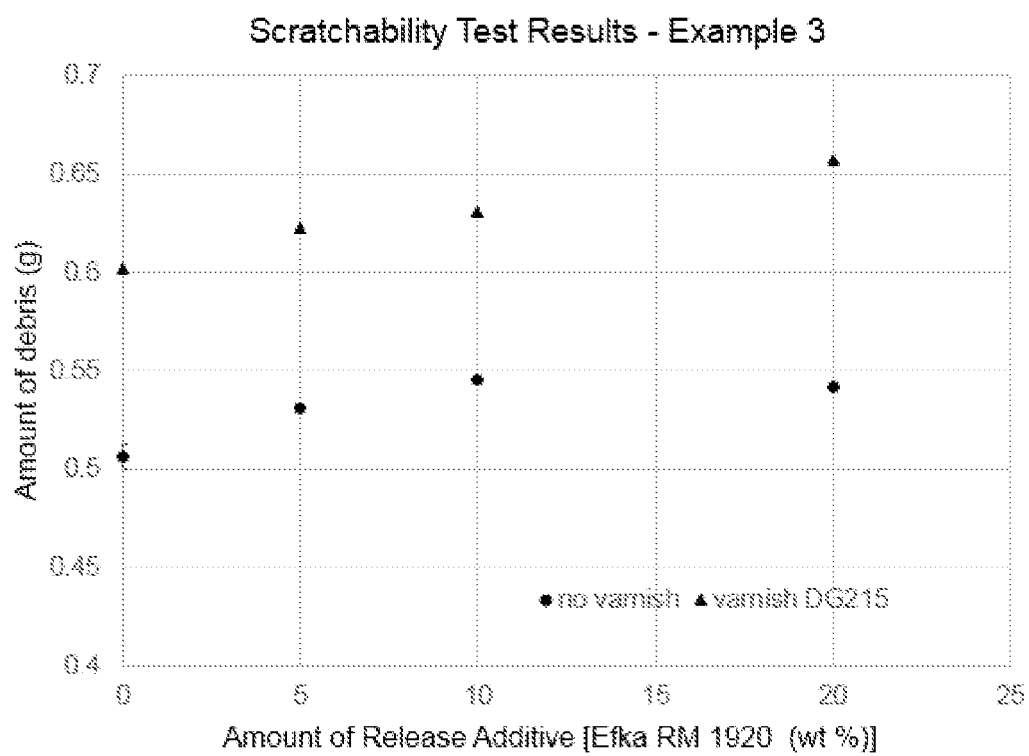
FIG. 3 shows the results of the scratchability test by using the Taber apparatus in Example 3.

The results of these tests on the scratch-off structures produced in Example 2 and the Comparative Examples are shown in the graph in FIG. 3. By testing several scratch-off structures with different amounts of release additive in the transparent electrostatic ink of the third layer, a clear trend emerges; the scratchability of the third layer, with the fourth layer overlying it being removed simultaneously, increases with increasing amount of release additive. Above approximately 10 wt % release additive, the scratchability levels off, remaining approximately constant for transparent electrostatic ink compositions with 10-15 wt % release additive FIG. 3 also shows that the scratchability of the transparent electrostatic ink composition (third layer) significantly increases when it is printed on the varnish (second layer) in comparison to printing it directly onto first layer.

The results of another method of testing the scratchability of the transparent electrostatic ink show a comparable trend. In this test, a coin or nail is drawn across a sample at a pressure of approximately 15 N to scratch off the third and fourth layers of the scratch off structure. Sample 1, a reference sample in which the third layer was omitted, showed a thin, partially incomplete, line where the coin/nail had removed some of the third and fourth layer. Sample 2, in which 5 wt % release additive was included in the transparent electrostatic ink composition of the third layer, showed a thicker line of removed third and fourth layers than sample 1. Finally, sample 3, in which 10 wt % release additive was included in the transparent electrostatic ink composition of the third layer, showed a thick line of removed third and fourth layers.

Example 4—Effect of Coat Weight of the Second Layer on Scratchability

In these tests, the scratch-off structures tested were similar to those in Example 1, except that the third layer was omitted, i.e. the fourth layer, the coloured electrostatic ink layer was printed directly onto the second layer, i.e. the overprint varnish. These tests were performed because 1) the scratch tests of the scratch-off structures including the transparent electrostatic ink layer, that is, the third layer, using the Taber scratch tester are problematic because of sliding effects due to the presence of the release additive and low resolution; and 2) it was an aim to "isolate" the influence of the presence of the varnish, that is, the second layer, on the scratchability. The results of the test give an indication of the correlation of the amount of overprint varnish with the scratchability of electrostatic ink composition printed on the overprint varnish.

The scratch-off structures used in these test were formed by the following method:

Information, in the form of words, letters, images or any combination thereof, was printed onto a paper substrate (300 g Condat paper) by using an HP Indigo 7000 printing press to form a first layer showing information.

DigiGuard® Gloss 210 (from Michelman, Inc), a transparent varnish, diluted to 40 wt % solids with water was applied over the first layer by using a drawdown rod, forming a second layer overlying the first layer. Different drawdown rods were used to achieve different coat weights of the varnish. Drawdown rods (from Diversified Enterprises, USA) #0 (designed to apply 0.2 gsm layer), #1.5 (designed to apply 0.4 gsm layer) and #4 (designed to apply 1.5 gsm layer) were used. The coat weight of the DigiGuard® Gloss was determined gravimetrically by using a washable plastic PET substrate.

No transparent liquid electrostatic ink was applied as the third layer and thus, no third layer is present in these scratch-off structures.

Finally, a layer comprising several coloured liquid electrostatic inks was printed over the second layer by using an HP Indigo 7000 printing press, providing an opaque layer through which the information printed on the paper substrate cannot be perceived. In this Example, the "fourth" layer comprises 200% black, 200% white and 100% magenta inks (HP Indigo ElectroInk® 4.5).

Figure 4:
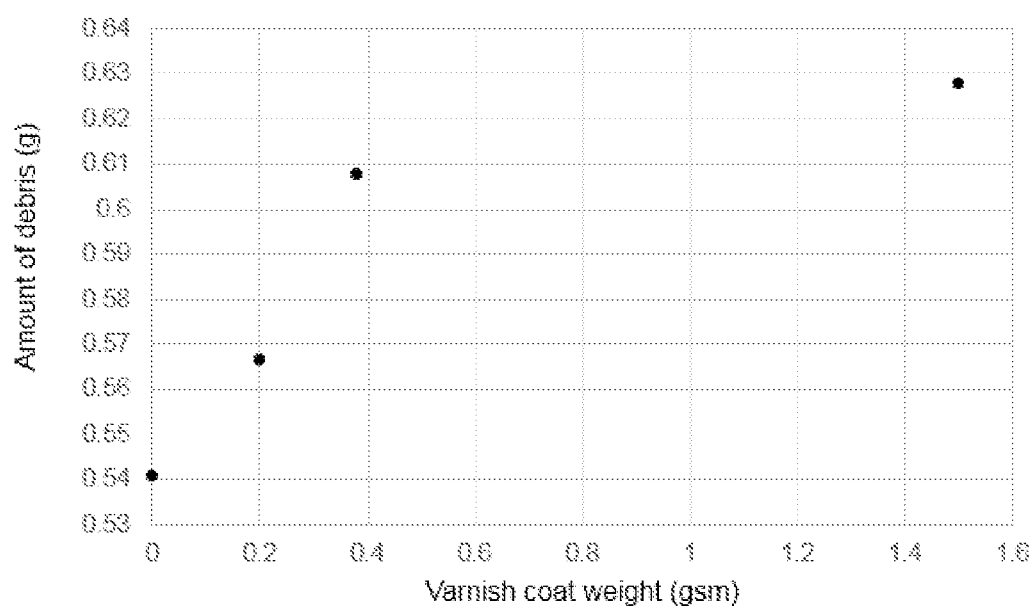
FIG. 4 shows the results of the scratchability tests in Example 4.

The scratch-off structures were tested for scratchability as described in Example 3. The results of these tests are displayed in FIG. 4. The graph shows that the scratchability increases with increasing coat weight of the varnish, that is, the second layer, and reaches and optimum coat weight at approximately 1.5 gsm.

While the composition and scratch-off structure has been described with reference to certain examples, those skilled in the art will appreciate that various modifications, changes, omissions, and substitutions can be made without departing from the spirit of the disclosure. It is intended, therefore, that the disclosure be limited by the scope of the following claims. The feature(s) of any dependent claim can be combined with the feature(s) of any of the other dependent claims and any of the independent claims.

The invention claimed is:

1. An electrostatic ink composition comprising a a fatty acid ester having a plurality of hydroxyl substituents constituting from 10 wt % to 30 wt % solids of the electrostatic ink composition.

2. The electrostatic ink composition according to claim 1, wherein the electrostatic ink is a transparent electrostatic ink.

3. The electrostatic ink composition according to claim 1, wherein the fatty acid ester having a plurality of hydroxyl substituents comprises a carbon chain comprising 4 to 40 carbon atoms.

4. The electrostatic ink composition according to claim 1, wherein the fatty acid ester having a plurality of hydroxyl substituents comprises a saturated fatty acid, an unsaturated fatty acid, a straight-chain fatty acid, a branched fatty acid, a cyclic fatty acid or a mixture thereof.

5. The electrostatic ink composition according to claim 1, wherein the fatty acid ester is the product of esterification of a plurality of fatty acids with a polyol, wherein the plurality of fatty acids may be the same or different from one another.

6. The electrostatic ink composition according to claim 1, wherein the fatty acid ester is a mono-, di- or triglyceride.

7. The electrostatic ink composition according to claim 6, wherein the fatty acid ester is a di- or triglyceride and each fatty acid chain comprises at least one hydroxyl substituent.

8. The electrostatic ink composition according to claim 1, wherein the fatty acid ester comprises a hydrogenated castor oil.

9. The electrostatic ink composition according to claim 1, further comprising:
a resin;
a carrier liquid; and
a charge director, a charge adjuvant, or both.

10. The electrostatic ink composition according to claim 9, wherein the resin is a thermoplastic resin having acidic side groups.

11. The electrostatic ink composition according to claim 1, wherein the fatty acid ester includes an esterfied monohydroxy fatty acid or an esterfied dihydroxy fatty acid.

12. The electrostatic ink composition according to claim 1, wherein the fatty acid ester includes hydroxycaprylic acid, hydroxycapric acid, hydroxylauric acid, hydroxymyristic acid, hydroxypalmitic acid, hydroxystearic acid, hydroxyarachidic acid, hydroxybehenic acid, hydroxycerotic acid; dihydroxycaprylic acid, dihydroxycapric acid, dihydroxylauric acid, dihydroxymyristic acid, dihydroxypalmitic acid, dihydroxystearic acid, dihydroxvarachidic acid, dihydroxybehenic acid; or dihydroxycerotic acid.

13. The electrostatic ink composition according to claim 1, wherein the fatty acid ester having a plurality of hydroxyl substituents is selected from the group consisting of 2-hydroxyvaleric acid, 2-hydroxycaproic acid, 6-hydroxycaproic acid, 2-hydroxyenanthic acid, 7-hydroxyenanthic acid, 2-hydroxycaprylic acid, 3-hydroxycaprylic acid, 8-hydroxycaprylic acid, 2-hydroxypelargonic acid, 3-hydroxypelargonic acid, 9-hydroxypelargonic acid, 2-hydroxycapric acid, 3-hydroxycapric acid, 10-hydroxycapric acid, 2-hydroxyundecanoic acid, 3-hydroxyundecanoic acid, 11-hydroxyundecanoic acid, 2-hydroxylauric acid, 3-hydroxylauric acid, 12-hydroxylauric acid, 2-hydroxytridecanoic acid, 3-hydroxytridecanoic acid, 13-hydroxytridecanoic acid, 2-hydroxymyristic acid, 3-hydroxymyristic acid, 14-hydroxymyristic acid, 2-hydroxypentadecanoic acid, 3-hydroxypentadecanoic acid, 15-hydroxypentadecanoic acid, 2-hydroxypalmitic acid, 3-hydroxypalmitic acid, 16-hydroxypalmitic acid, 2-hydroxymargaric acid, 3-hydroxymargaric acid, 17-hydroxymargaric acid, 2-hydroxystearic acid, 3-hydroxystearic acid, 4-hydroxystearic acid, 5-hydroxystearic acid, 6-hydroxystearic acid, 7-hydroxystearic acid, 8-hydroxystearic acid, 9-hydroxystearic acid, 10-hydroxystearic acid, 11-hydroxystearic acid, 12-hydroxystearic acid, 13-hydroxystearic acid, 14-hydroxystearic acid, 15-hydroxystearic acid, 16-hydroxystearic acid, 17-hydroxystearic acid, 18-hydroxystearic acid, 2-hydroxynonadecanoic acid, 3-hydroxynonadecanoic acid, 19-hydroxynonadecanoic acid, 2-hydroxyarachic acid, 3-hydroxyarachic acid, 20-hydroxyarachic acid, 3-hydroxyheneicosanoic acid, 21-hydroxyheneicosanoic acid, 2-hydroxybehenic acid, 3-hydroxybehenic acid, 3-hydroxytricosanoic acid, 2-hydroxylignoceric acid, 3-hydroxylignoceric acid, 2-hydroxyhexacosanoic acid, 2-hydroxytriacontanoic acid, 2-hydroxytetratriacontanoic acid, 2-methyl-2-hydroxyenanthic acid, 2-methyl-3-hydroxypelargonic acid, 3-methyl-3-hydroxypelargonic acid, 2-methyl-3-hydroxycapric acid, 2-methyl-3-hydroxyundecanoic acid, 3-methyl-3- hydroxyundecanoic acid, 2-methyl-2-hydroxylauric acid, 2-methyl-3-hydroxylauric acid, 2-methyl-2-hydroxytridecanoic acid, 2-methyl-3-hydroxytridecanoic acid, 3-methyl-3-hydroxytridecanoic acid, 2-methyl-2-hydroxymyristic acid, 2-methyl-3-hydroxymyristic acid, 2-methyl-2-hydroxypentadecanoic acid, 2-methyl-3-hydroxypentadecanoic acid, 3-methyl-3-hydroxypentadecanoic acid, 2-methyl-2-hydroxypalmitic acid, 2-methyl-2-hydroxymargaric acid, 2-methyl-3-hydroxymargaric acid, 3-methyl-3-hydroxymargaric acid, 2-methyl-2-hydroxystearic acid, 2-methyl-2-hydroxynonadecanoic acid, 2-methyl-2-hydroxynonadecanoic acid, and 3-methyl-3-hydroxynonadecanoic acid.

* * * * *